United States Patent [19]
Kiser

[11] Patent Number: 5,681,640
[45] Date of Patent: Oct. 28, 1997

[54] PASSIVE FIRE PROTECTION SYSTEMS FOR CONDUIT, CABLE TRAYS, SUPPORT RODS, AND STRUCTURAL STEEL

[75] Inventor: Michael D. Kiser, Pearland, Tex.

[73] Assignee: Flame Seal Products, Inc., Houston, Tex.

[21] Appl. No.: 550,094

[22] Filed: Oct. 27, 1995

[51] Int. Cl.$^6$ .............................. B32B 3/28; E02D 5/60
[52] U.S. Cl. ................ 428/181; 428/34.5; 428/34.6; 428/36.5; 428/245; 428/268; 428/913; 428/920; 428/921; 405/157; 405/211; 405/216; 156/82; 156/88
[58] Field of Search ..................... 428/174, 181, 428/920, 921, 289, 245, 168, 76, 101, 121, 285, 34.5, 34.6, 36.5, 913; 156/82, 171, 87, 88; 405/157, 195.1, 211, 216; 166/350, 357, 364, 367

[56] References Cited

U.S. PATENT DOCUMENTS

| | | | |
|---|---|---|---|
| 4,600,634 | 7/1986 | Langer | 428/220 |
| 5,158,397 | 10/1992 | Koos et al. | 166/364 |
| 5,169,265 | 12/1992 | Butler | 405/224.4 |
| 5,206,088 | 4/1993 | Raevsky | 428/413 |
| 5,378,530 | 1/1995 | Metivaud et al. | 428/447 |

*Primary Examiner*—Donald Loney
*Attorney, Agent, or Firm*—Winstead Sechrest & Minick P.C.

[57] ABSTRACT

A passive fire protection system for the protection of conduits, cable trays, support rods, and structural steel against flame and heat in a severe total environment type fire such as a hydrocarbon fire which includes a multi-layered (laminated), flexible material containing a plurality of layers of intumescent materials. This multi-layered material is configured such that it provides a containment system for the carbonaceous foam resulting from the expansion of the intumescent materials.

17 Claims, 6 Drawing Sheets

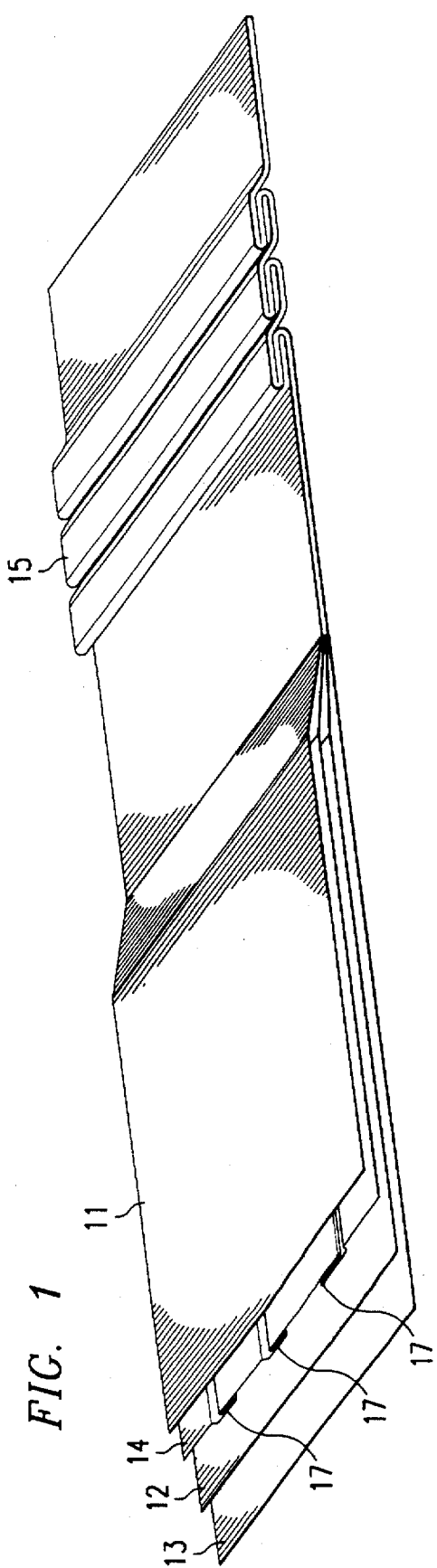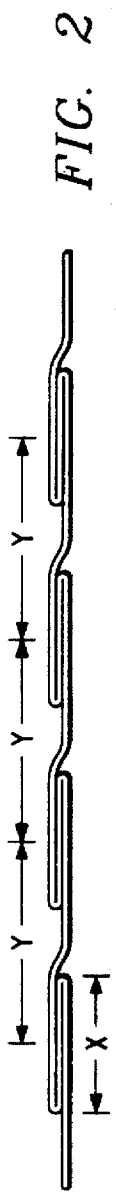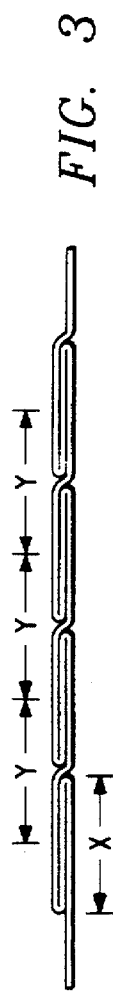

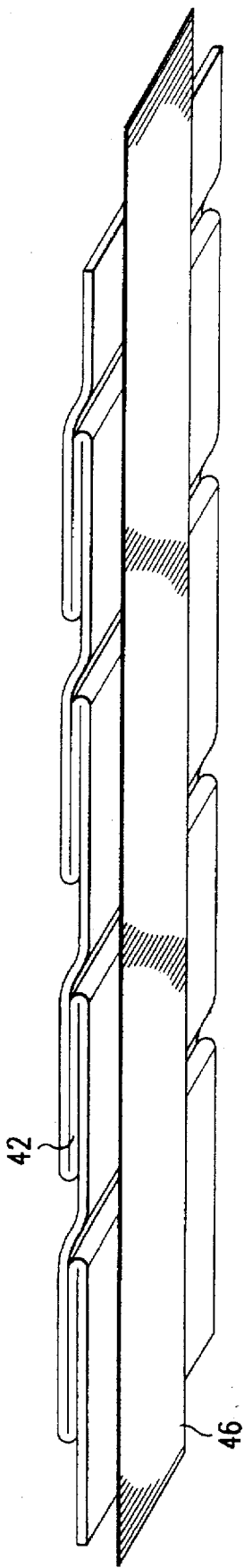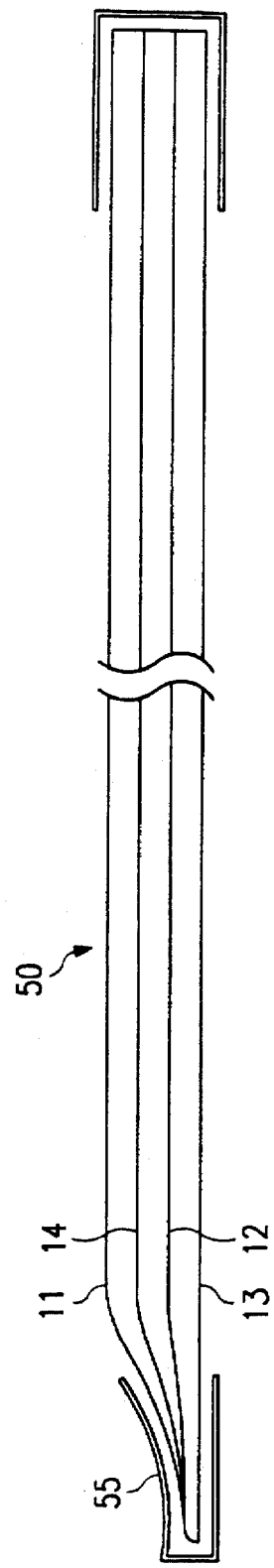

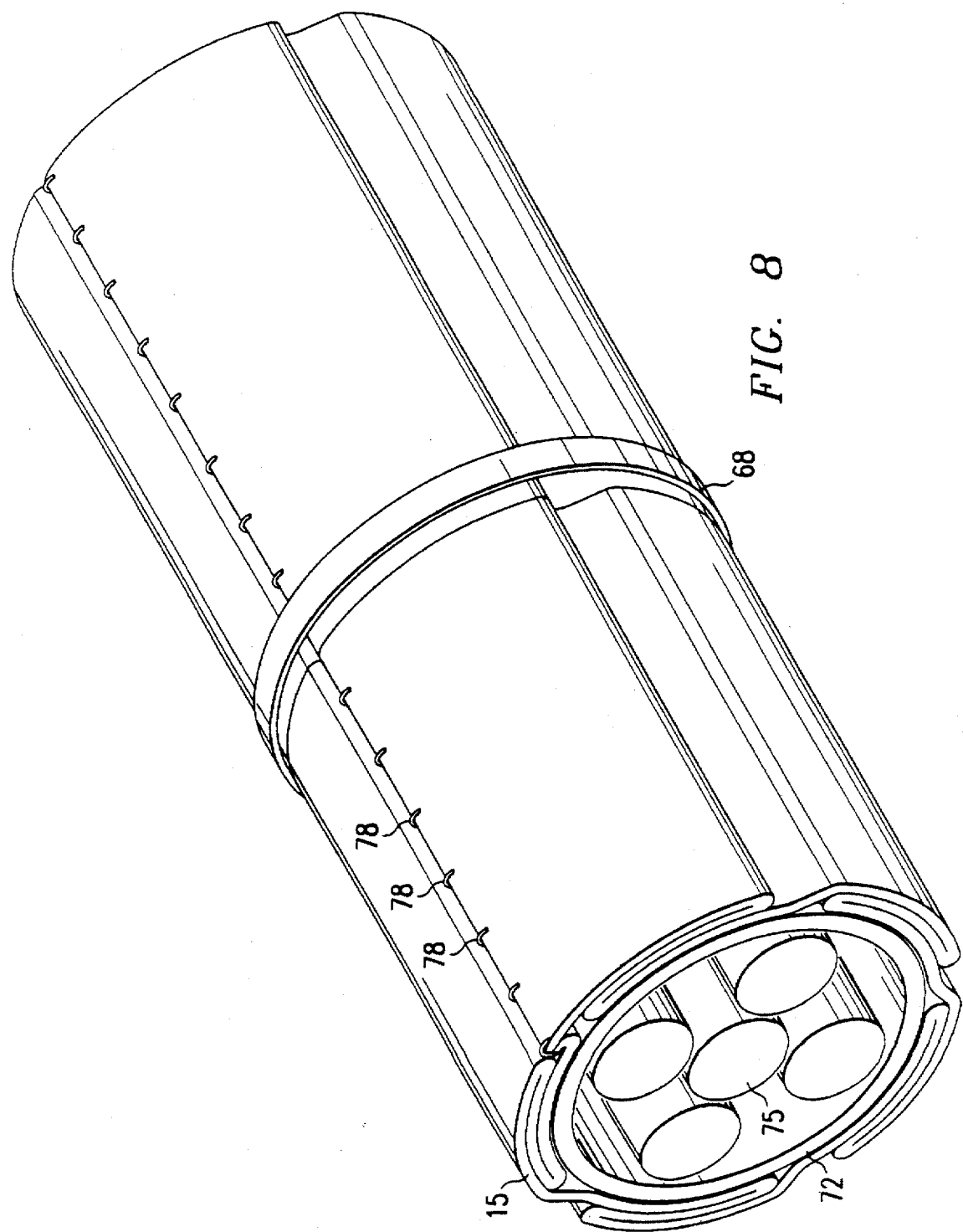

PASSIVE FIRE PROTECTION SYSTEMS FOR CONDUIT, CABLE TRAYS, SUPPORT RODS, AND STRUCTURAL STEEL

FIELD OF THE INVENTION

The present invention relates generally to the design of a passive fire protection system and more particularly, to an insulative and fire resistant/retardant wrap suitable for protecting conduits, cable trays, support rods, structural and other components from destruction during a fire.

BACKGROUND OF THE INVENTION

The following are three types of materials that have been used to protect conduits, cable trays, support rods, structural steel, and other construction materials from excessive heat during a fire and to retard the fire itself:

(1) insulation wraps, (2) endothermic wraps, and (3) intumescent coatings and materials.

Each category of these insulative materials has its drawbacks.

There are two primary problems with insulation wraps such as alumina silica blankets or mineral wool blankets. In order to achieve suitable fire protection in a severe total environment type fire, viz, a hydrocarbon fire, the material has to be very thick and as a result causes the two problems inherent in such systems. First, the fact that the material is thick causes problems with clearances between the protected item and adjacent or interfering items. Secondly, insulation systems cause a problem during normal operations because of the insulating factor. This problem is called "ampacity derating," which means that the heat generated by electrical cables within the conduit or cable tray is restricted from escape and causes the safe operating level of current allowable in said cables to be reduced or overheating will occur. The more severe the fire protection requirement, the more difficult this "Catch 22" becomes because the only way to increase the fire protection effect is to make the system thicker.

When this option is used to try to solve fire problems, it is common for the user to have to reduce the amperage rating of the system within the conduit or cable tray, thus losing efficiency originally designed into the systems.

Endothermic materials are composed of compounds that activate in a fire situation by breaking down at the molecular level and releasing trapped water which then cools the protected item. The most common example of this is alumina tri-hydrate, which is a dry white powder that releases large amounts of water at about 1,100° F. A well known endothermic product is the INTERAM™ E-50 series flexible wrap systems available from 3M Fire Protection Products, St. Paul, Minn.

Endothermic wrap materials have proved to be useful in fire protection in that some of the "thickness" problems inherent in insulation systems is somewhat lessened, but endothermics have their own problems. Due to the fact that the material has water molecules trapped in dry form, the total system package tends to be quite heavy. Also, there is still a problem with inherent insulative properties in products such as the 3M INTERAM™ E-50 wrap system because the system is generally installed in several layers with careful sealing requirements at all seams to hold in the water that will be released in a fire. The net effect of this is that, in every day operations, heat is still trapped within the system leading to ampacity derating.

Endothermics, such as 3M's INTERAM™ E-50 wrap system are also generally difficult to install, with very high associated labor costs. Also, once installed, these systems are extremely difficult to remove and replace in order to do maintenance work on electrical conduits or cable trays.

Intumescent products have gained a high level of interest recently because of the problems associated with insulations and endothermics as outlined above. Intumescent materials are products that "grow" or "thicken" only when exposed to heat, creating an insulation layer that separates the protected item from the fire.

One major advantage of intumescent materials is that the unreacted material is very thin and non-insulative. This characteristic makes intumescent materials ideal for insulating conduits and cable trays since these materials do not require ampacity derating as the insulation and endothermic systems do. Furthermore, these materials are simpler to install than insulation or endothermic systems. In fact, intumescent materials are often applied as a light weight coating over the area to be protected. In general, intumescent coatings are a preferred insulative material because they are thin, non-insulative (except in a fire), and light weight.

However, there are two severe problems with using intumescent products which make it difficult to provide consistent insulative protection. These two problems are:

(1) The carbonaceous "foam" that results when the intumescent materials expand upon exposure to heat is always very fragile and is generally damaged by the turbulence of a fire. Furthermore, expanded intumescent materials will commonly fall off of the coated surfaces due to the pull of gravity. This fragile nature of intumescent materials leads to the formation of "fissures" in the material which allow heat to penetrate to the protected surfaces. These fissures appear randomly and give the system a quality of unpredictability that is undesirable for fire protection systems. These "fissures" are particularly prominent where the intumescent materials have been used on curved surfaces or at the corners of sharp turns.

(2) In addition to fissure formation, when expanded intumescent materials are exposed to direct fire and heat in a hydrocarbon fire Exposure Test, the outer carbonaceous foam that is in direct contact with the fire tends to erode, thus exposing lower layers of the materials. The lower layers also erode, causing a geometric reduction of the effectiveness of the product over time. This eroding effect magnifies the unpredictability of the system. Furthermore, this erosion of the materials accelerates the growth of the above mentioned "fissures," once formed.

Thus, there exists a need for a fire protective system that can take advantage of the favorable qualities of intumescent materials, while providing a means of stabilizing the carbonaceous foam resulting from the reaction of the intumescent materials with heat.

It is therefore an object of the present invention to provide a system which can stabilize expanded intumescent materials.

A further object of the present invention is to provide a fire protective system that is easily customized to meet the specific fire protective needs of different environments.

It is another object of the present invention to provide a fire protective flexible wrap that can be easily installed, removed, or replaced on conduits, cable trays, support rods, and structural members.

It is yet another object of the present invention to provide a thin, light weight, low ampacity derating fire protective system.

Still yet another object of the present invention is to provide a fire protective system that can be easily custom fitted to any size or shape structure.

SUMMARY OF THE INVENTION

The present invention fulfills the need discussed above by disclosing a multi-layered containment system for intumescent materials.

In accordance with one aspect of the present invention, a fire protective system is provided that contains multiple layers of fire resistant materials with intumescent materials located between the layers of fire resistant materials. The resultant multi-layered material provides a flexible wrap that provides stability to expanded intumescent materials.

In accordance with another aspect of the present invention, a fire protective system is provided that includes alternate layers of fire resistant materials and intumescent material that is designed to expand one layer at a time and that will expand in all directions to provide a consistent and effective fire protective system.

One feature and advantage of the present invention is that it provides a thin, light weight fire protective system with a low ampacity derating.

Another feature and advantage of the present invention is that it provides a fire protective system that takes advantage of the favorable qualities of intumescent materials and stabilizes the carbonaceous material that results from the expansion of the intumescents in response to heat.

Another feature and advantage of the present invention is that it provides a fire protective system that can be optimized to meet the fire protective needs of different environments.

Another feature and advantage of the present invention is that it is easily installed, removed, and/or replaced on conduits, cables, trays, support rods, and any other structural members.

Yet another feature and advantage of the present invention is that it allows the intumescent material to expand evenly in all directions, no matter what configuration is being protected.

Still yet another feature and advantage of the present invention is that it provides a fire protective system that can be custom fitted to any size or shape structure.

An additional feature and advantage of the present invention is that it provides a fire protective system that is non-toxic to plants and animals, contains no petroleum derivatives, and generates essentially no smoke during exposure to fire or heat.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiments disclosed may be readily utilized as a basis for modifying or designing other structures for carrying out the same purpose of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following DETAILED DESCRIPTION OF THE INVENTION taken in conjunction with the accompanying drawings, in which:

FIG. 1 shows a side view of a preferred embodiment of the multi-layered material used in the present invention;

FIG. 2 is a side view of one embodiment of the invention, illustrating the manner in which the layers of material are folded;

FIG. 3 is a side view of an alternative embodiment of the invention, illustrating the manner in which the layers of material are folded;

FIG. 4 is a rear view of one embodiment of the multi-layered material, showing a method used to secure both sides of the material during manufacture;

FIG. 5 is an end view of an insulative strip showing one embodiment that allows joints to overlap during installation of the strip;

FIG. 8 shows a typical completed installation of a preferred embodiment of the present invention on an electrical conduit;

DETAILED DESCRIPTION OF THE INVENTION

Figure 6:
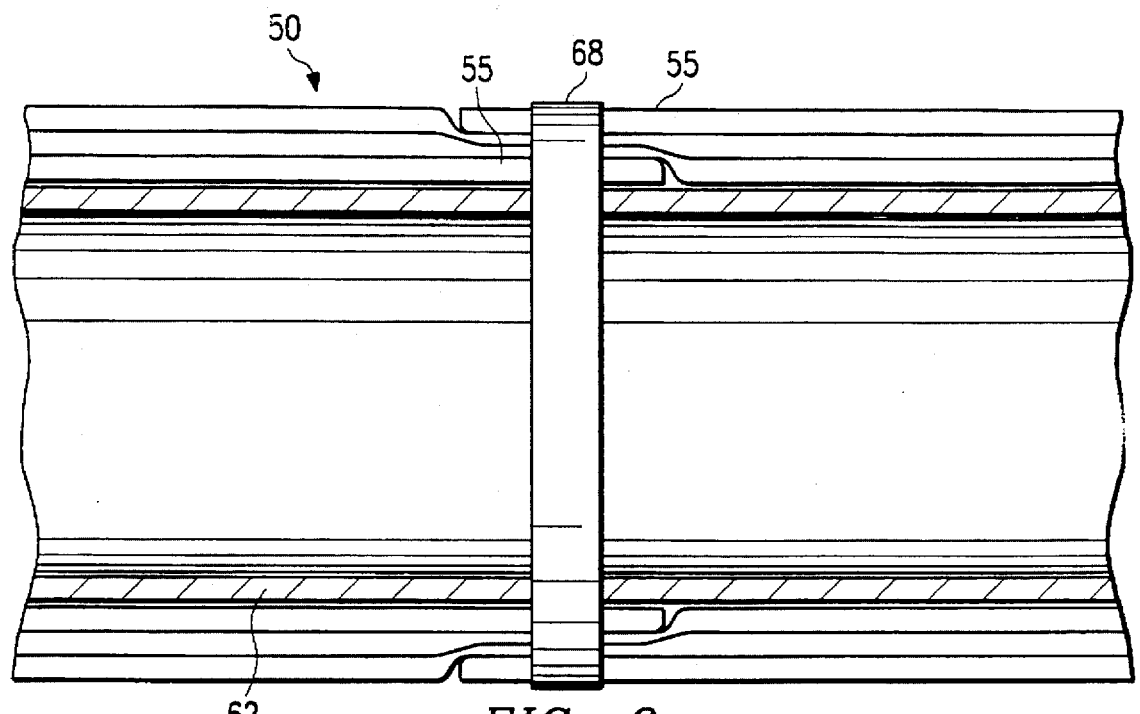
FIG. 6 is a cut-away drawing of two overlapping strips illustrated in FIG. 5.

The present invention relates to the design and manufacture of an improved passive fire protection system used to protect conduits, cable trays, support rods, and structural steel against the flame and heat of a total environment-type fire, such as a hydrocarbon fire.

Referring now to the drawings, and initially to FIG. 1, it is emphasized that the Figures, or drawings, are not intended to be to scale. For example, purely for the sake of greater clarity in the drawings, layer thicknesses and spacings are not dimensioned as they actually exist in the assembled embodiments.

FIG. 1 illustrates one embodiment of a flexible, multi-layered (or laminated) material 10 that is used to construct a fire protective or insulative wrap. For example, the embodiment illustrated in FIG. 1 is comprised of four layers of heat resistant materials. An exploded view of those layers is seen on the left side of FIG. 1. The component layers of this multi-layered material 10 may be composed of the same heat resistant materials or different heat resistant materials. Interspersed between the layers of fire-resistant materials is a high-level intumescent material which will expand significantly during a fire.

Although any flame resistant material can be used in the present invention, preferred embodiments will include metal foils, fire-resistant fabrics, or a combination of materials such as aluminum foil, stainless steel foil, fiberglass, or alumina silica fabric. A preferred embodiment of the present invention is illustrated in FIG. 1. In this embodiment, layers of fire-resistant material numbered 11,12, and 13 in FIG. 1 are made of thin sheets of aluminum foil (such as a 0.002 or 0.003 gauge foil) and folded layer 14 is made of a fiberglass material. Preferred embodiments of the fire protective system include at least one layer of folded material. The material may be folded in any number of configurations. It may be S-folded, accordion folded or pleated, as demonstrated in FIG. 1 by pleats 17. The number and size of pleats 17 is variable. Such variations being dependent upon the degree of fire protection required. Preferred embodiments of the present invention have pleats 17 in folded layer 14 running lengthwise in the multi-layered material 10.

Examples of preferred intumescent materials that can be used in the present invention to hold these layered materials together are 3M's CP-25 intumescent caulking material that can be obtained from 3M Fire Protection Products, St. Paul, Minn., or a FX-100 coating material available from Flame Seal Products, Inc., Houston, Tex. Thus, the embodiment of the present invention illustrated in FIG. 1 has four layers of heat resistant material held together with three layers of intumescent materials. The greater the expansion capacity of the intumescent materials utilized in the invention the greater the fire protective ability of the insulative wrap. Preferred intumescent materials will have an expansion capability of 700% or more. However, materials having lesser degrees of expansion may suffice in certain applications depending on the quantity of intumescent used between layers, the number of layers, the size of the folds, and the distance between the folds.

A preferred embodiment of the present invention utilizes two lower layers of 0.002 gauge aluminum foil, one middle layer of extreme heat-resistant fiberglass, and a top layer of 0.003 gauge aluminum foil. The top layer uses a heavier 0.003" foil to increase the strength and durability of the insulative wrap during installation and everyday use. The lower layers use a thinner foil since the lower layers are protected during everyday use and the thinner foil lowers the total weight of the insulative wrap. The outer layer of foil is sacrificial in a fire and is essentially burned or sublimated after about 3–5 minutes. The laminated multi-layered material 10 described above is further pleated or folded when made into a fire protective or insulative wrap. These pleats or folds 15, shown on the right side of FIG. 1, run sideways across the multi-layered material 10 approximately perpendicular to pleats 17 in folded layer 14. Such folds 15 may be simple pleats or S-folds as shown in FIG. 1. The number, configuration, and size of folds 15 can be varied according to the degree of fire protection required, the expansion capacity of the intumescent materials, and the size and shape of the protected surface.

The primary containment of the intumescent materials is accomplished by the system design of the insulative wrap. Folds 15 in the multi-layered material will typically expand, or unfold, during the first 10–15 minutes of a fire. Pleats 17 in folded layer 14 will also contribute significantly to the containment of the expanded intumescent materials. Folds 15 and pleats 17 allow for linear growth of the insulative wrap as the intumescent material expands thereby allowing the expanded insulative wrap to expand around interfering structures and banded joints. These folds and pleats also allow the system to expand to seal any penetrations of the system. The ability of the present invention to expand in a fairly uniform diameter around protected structures during a fire minimizes the heat exposure of the protected structure at all points in the system including sharp corners, banded joints, and points of intersecting structures.

FIGS. 2 and 3 show side views of preferred folded configurations into which the above laminated material 10 is formed. Folds 15 are shown as being a width X and spaced at a distance Y from the center of one fold 15 to the center of the adjacent fold 15. An example of folds 15 in the configuration illustrated in FIG. 2 would be folds 15 that are one inch in width and spaced at approximately two inches from the center of one fold to the center of the adjacent fold. FIG. 3 illustrates an alternative configuration where a similar one inch wide fold 15 would be spaced such that the distance from the center of one fold to the center of the adjoining fold would be approximately one inch. The width of folds 15 and the distance between folds 15 determine the "unfolded" length of the material and contributes to the final size of the perimeter of the expanded insulative wrap exposed to a fire. For example, a one inch spacing between the center of adjacent one inch wide folds, as illustrated in FIG. 3, yields an expansion capacity of three times the original circumference (or perimeter) of the protected item. Two inch spacings between one inch wide folds, as illustrated in FIG. 2, yield an expansion capacity of two times the original circumference (or perimeter).

FIG. 4 illustrates how the folds 15 in a preferred embodiment of the insulative wrap are secured to maintain the shape of the insulative wrap for installation and everyday use. The folded configuration of the multi-layered material 10 is secured by using an adhesive, such as an epoxy or a contact glue, between the surfaces of folds 15. When folds 15 are S-folds, as shown in FIG. 4, adhesive is placed on both sides of the middle section 42 of fold 15. The adhesive will hold the insulative wrap in its desired configuration during normal use, yet will release the layers of the S-fold as each layer reaches a certain temperature and melts or softens the adhesive to allow that layer of the S-fold to expand and separate from the next layer.

Preferred embodiments of the insulative wrap also have an adhesive fire resistant material 46, such as an industrial aluminum or stainless steel tape, running along the length of the bottom (or inner) side of the insulative wrap. The bottom adhesive material 46 can be trimmed to the proper length to fit the dimensions of the protected item or surface.

This bottom adhesive material 46 serves two purposes. One purpose is to help hold the insulative wrap in its everyday configuration. The other purpose is to ensure that the insulative material is held snugly against the protected item or structure during the expansion process in a fire. The bottom adhesive material 46 will continue to secure the insulative wrap to the protected surface during a fire because the insulative wrap will protect the protected surface from the type of elevated temperatures that would cause the adhesive material to soften and allow the insulative wrap to disengage from the protected surface.

By keeping the insulative wrap firmly in place around the protected surface the expanded intumescent material will compact as each subsequent layer begins its expansion. The bottom adhesive material 46 will thus allow the insulative material to expand in response to extremely elevated temperatures in an approximately symmetrical manner. As the insulative wrap is exposed to heat, its outer layers will expand away from the protected surface as described in more detail below. This symmetrical expansion prevents the system from obtaining a "bell shaped" configuration during a fire which could result in localized pressure points along the external surface of the insulative wrap and lead to fissures in the insulative wrap. The bottom adhesive material thus contributes to the ability of the insulative wrap to undergo a uniform expansion in all directions adding to the efficient operation of the fire protective system.

The insulative wrap may be made in any number of configurations, shapes and sizes to fit any shape or size of surface or structural item. However, one convenient embodiment of the insulative wrap is produced in strips 50 of any desired length as illustrated in FIG. 5. Folds 15 run along the length of the strip 50. One or both ends of strip 50 may have a narrow area, typically one inch wide, where the multi-layered material 10 was constructed with a minimal amount of intumescent material so as to provide a thinner area, approximately one-half the regular thickness of the insulative wrap. This thinner area 55, as shown in FIG. 5, provides a means of overlapping two strips 50 and securing that overlap with a heat resistant securing device 68, such as a stainless steel band as shown in FIG. 6. When the insulative wrap expands during exposure to a fire the intumescent materials will expand around the securing device 68 to protect the securing device 68 and avoid the production of "hot spots" on the protected surface. The ability to overlap thinner areas 55 provide an easy means of protecting surface 62.

Figure 7:
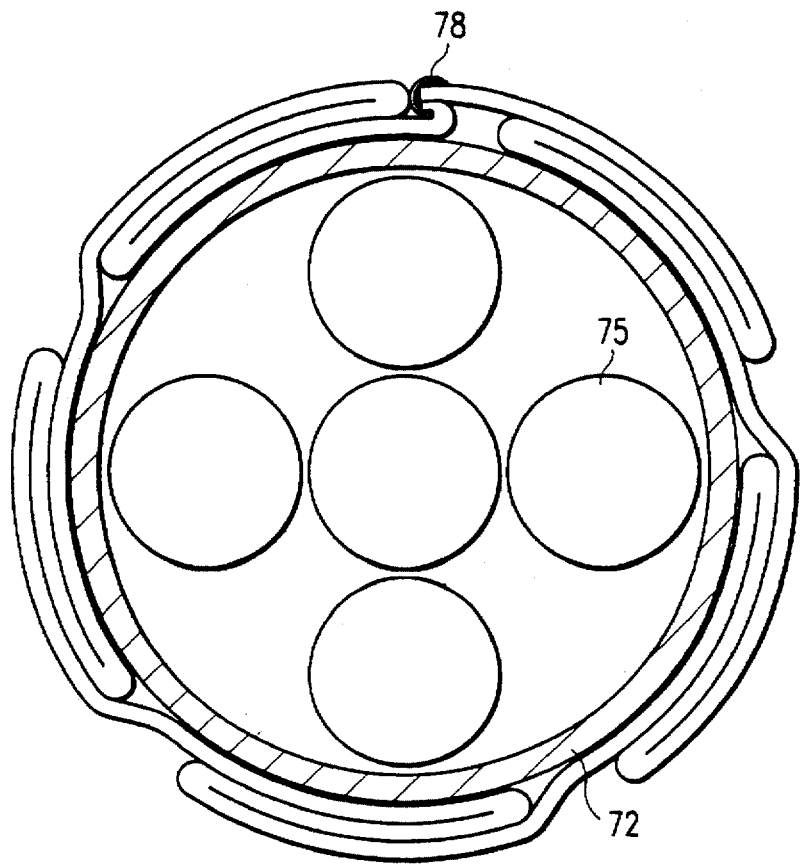
FIG. 7 is an end view of a preferred embodiment of the present invention installed around a typical conduit.

FIG. 7 illustrates one method of joining the sides of the insulative wrap where it has been wrapped around an electrical conduit 72 containing electric cables 75. If the insulative wrap has been constructed such that it has a space between folds 15, the insulative wrap is easy to cut in such a space and to join together using fasteners 78, such as stainless steel hog rings. Typically when the insulative wrap is installed on an electrical conduit 72, a fastener 78 is placed every ½ to one inch apart along the linear seams of the insulative wrap such as illustrated in FIG. 8. The site where fastener 78 secures two sides of insulative wrap together may be covered with an adhesive metal tape. Although not essential, this tape adds to the appearance of the fire protective system and helps reduce moisture accumulation on fasteners 78.

Figure 9A:
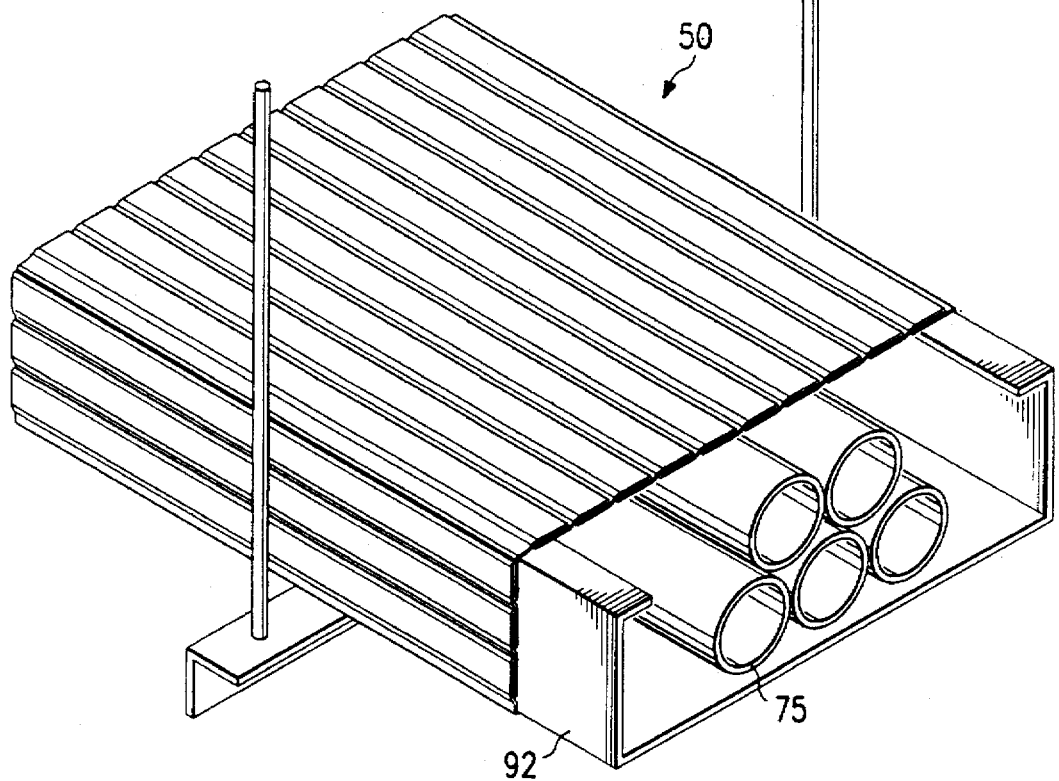
FIG. 9A is a side view of one embodiment of the present invention installed around a cable tray.
Figure 9B:
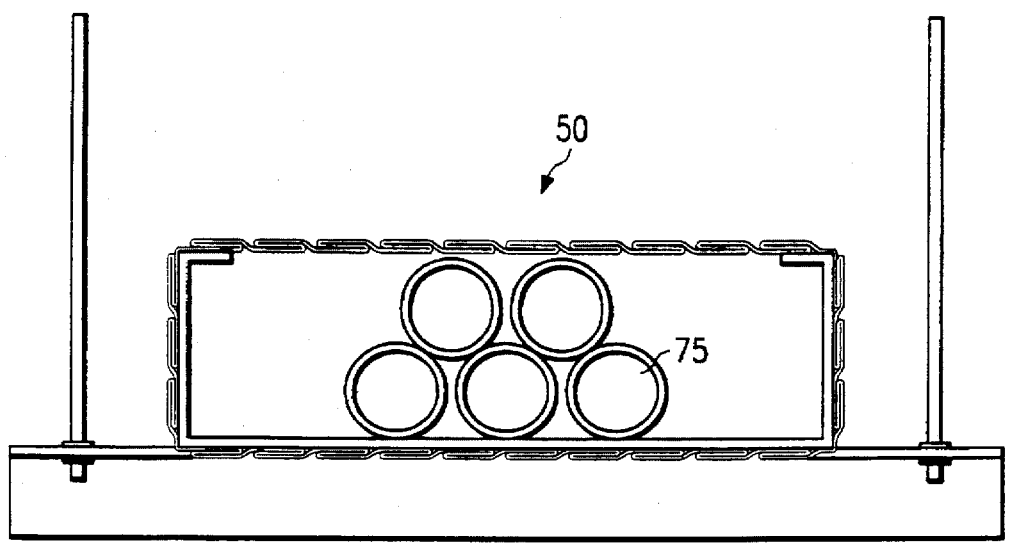
FIG. 9B is an end view of an embodiment of the present invention installed around a cable tray.

FIG. 8 shows the insulative wrap installed on a typical electrical conduit. FIGS. 9A and B show a strip 50 of the insulative wrap installed on a typical electrical cable tray 92.

Turning now to the operation of the insulative material, FIG. 10 is a series of five drawings showing the growth stages of the described preferred embodiment of the insulative material during exposure to a fire. FIG. 10A shows the insulative wrap illustrated in FIG. 1 before it has been exposed to a fire. FIG. 10B shows the initial activation of the fire protective system. In FIG. 10B folds 15 have been released and have risen to approximately a 90° angle as internal pressures from the expanding intumescent materials begin to exert their effect. The resultant pressures from the expanding intumescent materials will seek an equilibrium state, and therefore, due to this design, will yield a symmetrical expansion around the protected surface. A major advantage of the present invention is that even if the insulative wrap is breached or eroded at one point the pressure of the expanding intumescents will cause the expanded material to fill the breach in the system, therefore providing a self-healing system. During this initial stage of activation the outer layer of aluminum foil will burn off and expose the layer of intumescent material protecting the folded fiberglass layer.

Figure 10A:
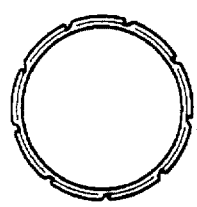
FIGS. 10A–10E illustrates the stages of growth of one embodiment of the present invention during a fire situation.
Figure 10B:
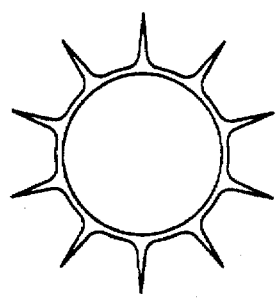
Figure 10C:
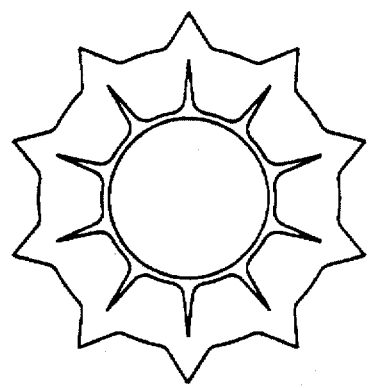
Figure 10D:
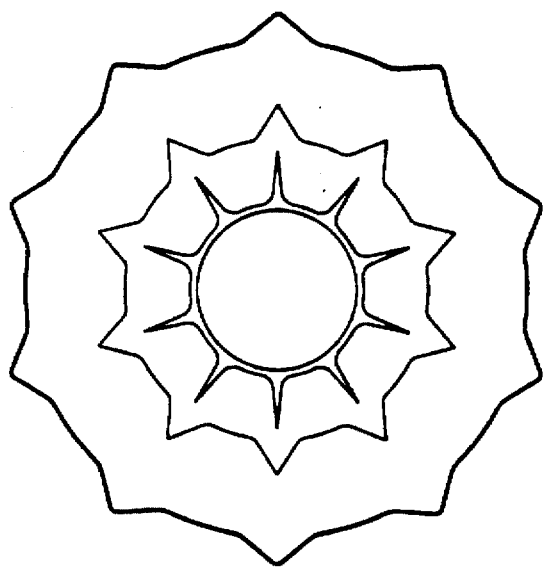
Figure 10E:
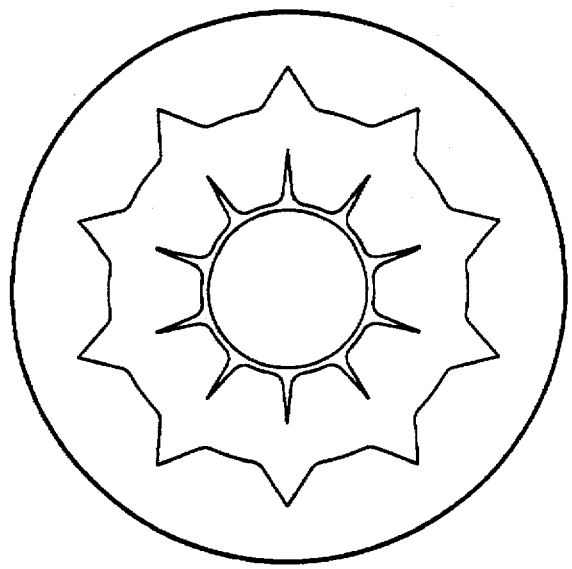

FIG. 10C shows the early expansion process under way when the first layer of intumescent material has expanded. The expanded intumescent material will insulate the lower layers of intumescent material and delay their expansion. In FIG. 10D, two layers of intumescent material are shown expanding. The outer layer of intumescent material and the first layer under the folded fiberglass layer are moving toward a state of equilibrium. FIG. 10E shows the final configuration of the expanded insulative wrap. At this point folds 15 and pleats 17 have expanded to their design limit, the top two layers of intumescent material have expanded to a state of equilibrium, the bottom layer of intumescent material remains in its original state against the protected surface, and the expanded intumescent material has compacted and reached a state of equilibrium with a common density throughout the system.

One advantage of the present invention is that it is designed to include sufficient intumescent material that even after it has fully expanded it has residual expansion ability. This design feature essentially eliminates the problem of fissure formation since the expanded intumescent material will always be in the process of "compacting" during a fire situation as additional intumescent material expands.

Once the entire system has completely expanded and all intumescent material has reacted and reached an equilibrium, the expanded insulative wrap will act as any other insulative material. This fact is but one of the considerations that is taken into account when deciding how thick the final system must be after expansion is complete.

The fire protective effectiveness of the present invention has been tested for the preferred embodiment described above. The insulative wrap was installed around a one inch conduit and the wrapped conduit was placed in a furnace. Two teflon jacketed thermocouples (T/C 1 and T/C 2 in Table 1) were placed in the furnace to record the furnace temperature and two thermocouples (T/C 3 and T/C 4 in Table 1) were placed along the surface of the conduit underneath the insulative wrap to measure the temperature of the conduit surface during the testing procedure. The furnace was lit and within 7 minutes had reached 2000° F. and was maintained at approximately that temperature for 30 minutes as recorded by T/C 1 and T/C 2 and set forth in Table 1. The surface of the conduit was efficiently protected from the flames and the 2000° F. heat. In fact, the surface of the conduit (as recorded by T/C 3 and T/C 4) was consistently less than 250° F. throughout the entire 30 minute test as seen in Table 1.

The design of the present invention, a five-protective and insulative wrap, utilizes the ability of intumescents to expand in volume during a fire, when protection is needed. Thus the insulative wrap can be installed as a thin, lightweight, and non-insulative material. Further, the present invention solves existing problems with the use of intumescent coatings (i.e., the formation of fissures and the tearing away of the expanded carbonaceous material by the turbulence of a fire). The present invention contains the intumescent material within the system as it expands, much as the foil design contains expanding popcorn in the product JIFFY POP™.

The design can be varied according to the severity of the fire protection requirement by adjusting the amount of intumescent material in the layers, adding more layers and by adjusting the size and dimension of the S-folds to yield a larger expanded diameter.

An enhancement of the insulative effect of this invention is realized when progressive, separate "layers" of intumescent materials are designed to grow outward toward the fire or heat one at a time, thereby protecting and delaying the successive lower layers from expanding outward. This delayed effect on the inner intumescent layers creates an endothermic effect, in addition to the insulative and heat absorptive properties of expanding intumescent materials. The protected lower layers, during the expansion of the upper layers of intumescent materials, release water in the slowed process of heat exposure and growth, thereby cooling the protected item with greater efficiency. During the exposure and growth of successive layers outward toward the fire, lower layers are protected by three mechanisms operating at the same time.

1. The reaction temperature of most intumescent products is 350° F. to 500° F. As long as there is any unreacted product within the system, the layer directly below the reacting product will not reach its reaction temperature.

2. As carbonaceous foam forms and grows, an increasingly thicker insulation layer is formed and acts purely as an insulator.

3. As the temperature increases, the exposure of inner layers of intumescent material to moderate temperatures will release water producing an endothermic effect, thereby temporarily preventing the temperature of the inner layers of the insulative wrap from surpassing 212° F. due to the boiling point of water. The present invention will also temporarily trap any steam that is formed which will also lessen the rate of temperature increase above 212° F.

In summary, the growing material insulates lower layers and slows them from reacting or growing. As the heat builds up and reacts the first layer of intumescent materials the second layer is protected from the heat. Once the heat gets through the first layer of intumescent material, or the insulative wrap has completed its first phase of growth, the next layer of intumescent material reacts and grows outward further compacting the carbonaceous foam resulting from the expansion of the first layer of intumescents. The expansion of the second layer of intumescents protects the third layer of intumescents from reacting or expanding to the heat, and so on until the entire system is expanded to its final size and all intumescent materials within are compacted within the containment system provided by the heat resistant materials that are layered throughout the system. This entire process, plus the above described endothermic effects and successive reaction processes, takes time to complete as the entire process is cyclic in nature. Once the system has completely reacted and expanded to its full extent the resultant insulative wrap will act strictly as an insulative material of considerable thickness.

Although the present invention has been disclosed in connection with conduits, cable trays, support rods, and structural steel in a petrochemical environment, the present invention may be used wherever fire protection is needed such as in a home or an office building. The configuration of the insulative material is easily customized to surround any circular, square, rectangular, or irregularly shaped item.

As described earlier, the design uses layers of metallic foils and fire resistant fabrics to contain the intumescent materials and protect them from direct contact with the fire environment. However, modifications can be made to resist more severe situations such as explosions or jet fires by using a stainless steel foil outer layer and a stainless steel mesh lower layer for stronger system integrity.

The invention provides industry with an ideal product for fire protection of conduits, cable trays, support rods, and structural steel as it has the following properties:

(1) Thin;

(2) Light weight;

(3) Low ampacity derating (non-insulative except in a fire);

(4) Easy to install (one layer; simple techniques);

(5) Can be removed and re-installed;

(6) Safe and environmentally friendly; and (7) Easily custom fitted to any size and shape structure.

TABLE 1

THERMOCOUPLE TEMPERATURE READINGS

| TIME MINUTES | T/C 1 FURNACE | T/C 2 FURNACE | T/C 3 CONDUIT | T/C 4 CONDUIT |
| --- | --- | --- | --- | --- |
| 1 | 1037 | 1289 | 82.8 | 82.4 |
| 2 | 1193 | 1299 | 82.8 | 80 |
| 3 | 1335 | 1484 | 83 | 82.6 |
| 4 | 1615.6 | 1700 | 83.4 | 83.2 |
| 5 | 1742 | 1839 | 84.8 | 84.4 |
| 6 | 1887 | 1938 | 87.6 | 87 |
| 7 | 2032 | 2036 | 90.4 | 89.6 |
| 8 | 1982 | 2010 | 94.8 | 93.8 |
| 9 | 1970 | 1980 | 100.4 | 99.8 |
| 10 | 2008 | 1992 | 108.6 | 109.8 |
| 11 | 1973 | 1974 | 122.6 | 124.2 |
| 12 | 1966 | 1990 | 148.4 | 147.2 |
| 13 | 1922 | 1926.6 | 164 | 176.4 |
| 14 | 1904 | 1900 | 166 | 180.4 |
| 15 | 1995 | 2052 | 173.2 | 183.6 |
| 16 | 1934 | 1938 | 178.4 | 183.8 |
| 17 | 2005.6 | 2014.4 | 183.6 | 183.4 |
| 18 | 1950 | 1948.4 | 187.4 | 184.4 |
| 19 | 1965 | 1964.8 | 190.4 | 190.4 |
| 20 | 1988 | 1993 | 195 | 197.8 |
| 21 | 1987 | 1987.8 | 198 | 201.8 |
| 22 | 2020.4 | 2022.2 | 201.8 | 203 |
| 23 | 1922.2 | 1921.8 | 206.4 | 204.6 |
| 24 | 2024.4 | 2019.4 | 209.8 | 206.2 |
| 25 | 1976.8 | 1986 | 211 | 209.6 |
| 26 | 2004.2 | 2002.8 | 213 | 210.3 |
| 27 | 1987.4 | 1987 | 216.4 | 210.6 |
| 28 | 1968.4 | 1968.6 | 219.2 | 211.2 |
| 29 | 1878 | 1878 | 223.6 | 213.4 |
| 30 | 1968 | 1962.6 | 230.4 | 221.8 |

Having described preferred embodiments of the present invention, it is believed that other modifications, variations and changes will be suggested to those skilled in the art in view of the description set forth above. It is therefore to be understood that all such variations, modifications and changes are believed to fall within the scope of the invention as defined in the appended claims.

What is claimed is:

1. A fire protection system comprising:
   a folded sheet of fire resistant material, said folded sheet having a plurality of folds running substantially parallel to each other;
   a flexible layer of heat resistant material; and
   a layer of an intumescent material localized between said folded sheet and said flexible layer, said intumescent material expanding when subjected to elevated temperatures;
   wherein said folded sheet will unfold in response to the expansion of said intumescent material to provide stability to said expanded intumescent materials.

2. The fire protection, system of claim 1, wherein said layer of heat resistant material is comprised of a metallic foil.

3. The fire protection system of claim 2, wherein said metallic foil is aluminum foil.

4. The fire protection system of claim 1, wherein said folded sheet of fire resistant material is comprised of fiberglass.

5. The fire protection system of claim 1, wherein said intumescent material has an expansion capacity of about 700% or more.

6. The fire protection system of claim 1, wherein said intumescent material is FX-100 intumescent.

7. The fire protection system of claim 1, wherein said folded sheet, said flexible layer of heat resistant material and said intumescent material are assembled into a multiple layered wrap and folded to form a plurality of folds running substantially perpendicular to said plurality of folds in said folded sheet.

8. The fire protection system of claim 1 further comprising an adhesive metallic tape, wherein a one side of said metallic tape adheres to a surface being protected by said fire protection system and a second side of said metallic tape adheres to said flexible layer of heat resistant material, said metallic tape useful in the installation of said fire protection system.

9. A fire protective system comprising:
   a plurality of sheets of metallic foil;
   a fiberglass material having a plurality of primary folds therein; and
   a plurality of intumescent layers, said intumescent layers disposed between said sheets of metallic foil and between said metallic foil and said fiberglass material;
   wherein said metallic foil, said fiberglass material, and said intumescent layers are assembled into a multi-layered wrap having a plurality of secondary folds, said secondary folds extending in an approximately perpendicular direction to said primary folds.

10. The fire protective system of claim 9, wherein said secondary folds unfold in response to the expansion of said intumescent layers when said intumescent layers react to heat.

11. The fire protective system of claim 9, wherein said metallic foil is aluminum.

12. The fire protective system of claim 9, wherein said primary folds will unfold as said intumescent layers expand in response to increased temperatures.

13. The fire protective system of claim 9, wherein said intumescent layers are comprised of an intumescent with an expansion capacity of about 700% or more.

14. The fire protective of claim 9, wherein said intumescent layers are comprised of FX-100 intumescent.

15. The fire protective wrap of claim 9, said insulative wrap having three layers of intumescent material.

16. The fire protective wrap of claim 9, wherein said intumescent layers are configured such that said layers will react to heat in a sequential manner.

17. A method of manufacturing a fire protective system, said method comprising the steps of:
   providing a plurality of sheets of heat resistant material;
   providing a folded sheet of fire resistant material having a plurality of primary folds therein;
   providing an intumescent material;
   assembling a multi-layered wrap by placing said intumescent material between said sheets of heat resistant material and between said folded sheet and said heat resistant material; and
   folding said multi-layered wrap to form a plurality of secondary folds that are substantially perpendicular to said primary folds;
   wherein said primary and said secondary folds will unfold as said intumescent material expands in response to elevated temperatures.

* * * * *